United States Patent
Oh et al.

(10) Patent No.: US 11,625,959 B2
(45) Date of Patent: Apr. 11, 2023

(54) SYSTEM AND METHOD FOR DETERMINING BACKLASH IN DRIVING SYSTEM OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 16/855,371

(22) Filed: Apr. 22, 2020

(65) Prior Publication Data
US 2021/0049843 A1 Feb. 18, 2021

(30) Foreign Application Priority Data
Aug. 13, 2019 (KR) .................. 10-2019-0098582

(51) Int. Cl.
*G07C 5/08* (2006.01)
(52) U.S. Cl.
CPC .......... *G07C 5/0808* (2013.01); *G07C 5/085* (2013.01)
(58) Field of Classification Search
None
See application file for complete search history.

(56) References Cited

U.S. PATENT DOCUMENTS

| 2010/0114424 A1* | 5/2010 | Morris | B60W 30/20 701/51 |
| 2020/0259431 A1* | 8/2020 | Sawada | H02P 5/52 |
| 2021/0086622 A1* | 3/2021 | Zhang | B60L 7/26 |

FOREIGN PATENT DOCUMENTS

JP         2014220919 A   * 11/2014

* cited by examiner

*Primary Examiner* — Abdhesh K Jha
(74) *Attorney, Agent, or Firm* — Fox Rothschild LLP

(57) ABSTRACT

A system and method for determining backlash in a driving system of a vehicle are provided. The system includes a motor speed sensor that detects a motor speed and a wheel speed sensor that detects a wheel speed. A speed difference determination unit receives the detected motor and wheel speeds and determines a rotational speed difference of the driving system. A torsion speed determination unit receives the determined rotational speed difference and determines a reference torsion speed for backlash determination of the driving system. A backlash determination unit receives the determined rotational speed difference and the determined reference torsion speed, determines a backlash speed corresponding to a difference between the rotational speed difference and the reference torsion speed, and determines whether backlash in the driving system occurs using the determined backlash speed.

18 Claims, 3 Drawing Sheets

SYSTEM AND METHOD FOR DETERMINING BACKLASH IN DRIVING SYSTEM OF VEHICLE

CROSS-REFERENCE TO RELATED APPLICATION

This application claims under 35 U.S.C. § 119(a) the benefit of priority to Korean Patent Application No. 10-2019-0098582 filed on Aug. 13, 2019, the entire contents of which are incorporated herein by reference.

BACKGROUND

(a) Technical Field

The present disclosure relates to a system and method for determining backlash in a driving system of a vehicle, and more particularly, to a system and method which may more easily and accurately determine occurrence of backlash in a driving system of a vehicle.

(b) Background Art

In motor-driven vehicles, i.e., eco-friendly vehicles, such as a battery electric vehicle (BEV), a hybrid electric vehicle (HEV) and a fuel cell electric vehicle (FCEV), damping elements, such as torsional dampers, which are provided in consideration of backlash and torsion characteristics of a driving system, are insufficient, and thus, vibration and impact may occur when the direction of an effective transfer torque in the driving system is changed. In particular, a driving system between a motor operating as a vehicle driving source and driving wheels in a motor-driven vehicle includes various elements having backlash and torsion characteristics, such as a transmission (reducer), a final reduction gear, a drive shaft, etc.

Therefore, the driving system from the motor to the driving wheels may be regarded as a rigid body which is integrally rotated, but during actual driving, backlash and torsions may occur in the driving system between the motor and the driving wheels. For example, in a situation in which a driving torque is suddenly changed, for example, when a driver suddenly steps on or engages an accelerator pedal or suddenly disengages the accelerator pedal, backlash in the driving system may occur. Accordingly, when there is a sudden vehicle operation or driving input by the driver, backlash in the driving system may occur, and thereby, vibration, impact and noise may occur.

In vehicles, securing vehicle responsiveness to driving input by a driver, such as operation of the accelerator pedal or a brake pedal, and reducing noise, vibration and harshness (NVH) caused by a sudden change in driving force conflict with each other. Therefore, in terms of generation of a driving force command for a vehicle driving source, for example, a motor torque command, to generate an optimal motor torque command to overcome the above conflicting relations, gradient restriction and a filter using various conditions as factors are used.

Particularly, to relieve backlash in the driving system which occurs at a point in time when the direction of driving force is changed, applies impact to a drive shaft and thus influences drivability, control for restricting a rate of change of driving force according to a section is performed, and the control has a negative influence on securement of responsiveness. Further, in this case, to restrict the rate of change, a restriction value must be calibrated for each section, and substantial effort to determine conditions in which such a backlash section occurs through tests is required.

SUMMARY

The present disclosure provides a system and method which may more easily and accurately detect and determine occurrence of backlash in a driving system during driving of a vehicle.

In one aspect, the present disclosure provides a system for determining backlash in a driving system of a vehicle that may include a motor speed detection unit configured to detect a motor speed, a wheel speed detection unit configured to detect a wheel speed, a speed difference determination unit configured to receive the detected motor speed and wheel speed and to determine a rotational speed difference of the driving system, occurring between a motor and a driving wheel, from the motor speed and the wheel speed, a torsion speed determination unit configured to receive the determined rotational speed difference of the driving system and to determine a reference torsion speed for backlash determination of the driving system based on the rotational speed difference of the driving system and a motor torque command generated during driving of the vehicle, and a backlash determination unit configured to receive the determined rotational speed difference of the driving system and the determined reference torsion speed, to determine a backlash speed that corresponds to a difference between the rotational speed difference of the driving system and the reference torsion speed, and to determine whether backlash in the driving system occurs using the determined backlash speed.

In another aspect, the present disclosure provides a method for determining backlash in a driving system of a vehicle that may include detecting, by a motor speed detection unit, a motor speed; detecting, by a wheel speed detection unit, a wheel speed; determining, by a controller, a rotational speed difference of the driving system occurring between a motor and a driving wheel from the detected motor speed and the detected wheel speed; determining, by the controller, a reference torsion speed for backlash determination of the driving system based on the determined rotational speed difference of the driving system and a motor torque command generated during driving of the vehicle; determining, by the controller, a backlash speed that corresponds to a difference between the determined rotational speed difference of the driving system and the determined reference torsion speed, and determining, by the controller, whether backlash in the driving system occurs using the determined backlash speed.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
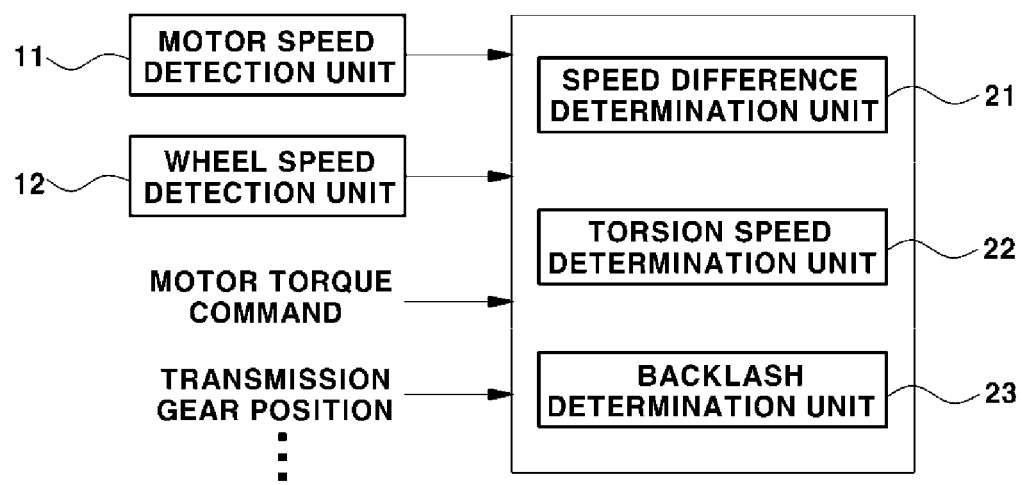
FIG. 1 is a block diagram illustrating the configuration of a system for determining backlash in a driving system in accordance with one exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

Figure 2:
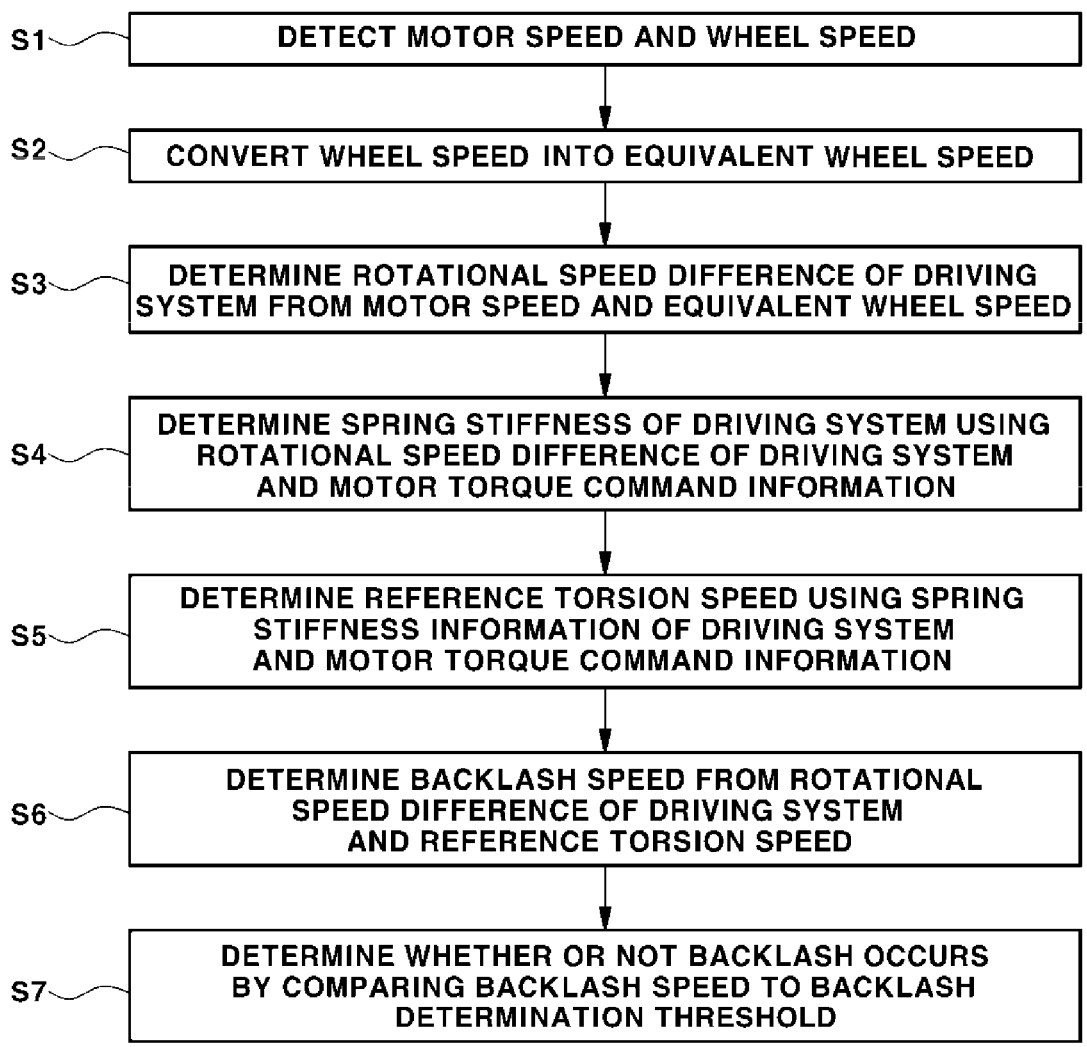
FIG. 2 is a flowchart illustrating a method for determining backlash in a driving system in accordance with one exemplary embodiment of the present disclosure.

FIG. 1 is a block diagram illustrating the configuration of a system for determining backlash in a driving system in accordance with one exemplary embodiment of the present disclosure, and FIG. 2 is a flowchart illustrating a method for determining backlash in a driving system in accordance with one exemplary embodiment of the present disclosure.

First, a system for determining backlash in a driving system in accordance with one exemplary embodiment of the present disclosure may include a motor speed detection unit 11, a wheel speed detection unit 12, a speed difference determination unit 21, a torsion speed determination unit 22, and a backlash determination unit 23. Each of the units may be operated by a controller. In particular, motor speed detection unit 11 may be configured to detect a motor speed and may include a resolver installed in a motor of a motor-driven vehicle, detect the motor speed, and output a signal based on a detected value, i.e., a motor speed signal (operation S1). The wheel speed detection unit 13 may be configured to detect a speed of a driving wheel and may include a wheel speed sensor installed at a driving wheel of a vehicle, detect the speed of the driving wheel, and output a signal according to a detected value, i.e., a wheel speed signal (operation S2).

In the system in accordance with one exemplary embodiment of the present disclosure, while the motor speed detection unit 11 and the wheel speed detection unit 12 are detection elements or sensors configured to detect status values, the speed difference determination unit 21, the torsion speed determination unit 22 and the backlash determination unit 23 may be configured to perform a designated determination process including arithmetic operations, and thus, in the present disclosure, these elements performing the determination process may be integrated into one unit, i.e., a controller.

The speed difference determination unit 21 may be configured to receive the motor speed signal from the motor speed detection unit 11 and the wheel speed signal from the wheel speed detection unit 12, and calculate a rotational speed difference of the driving system from the motor speed and the wheel speed (operation S3). In particular, the rotational speed difference of the driving system may be defined as a difference between rotational speeds, which occurs in the driving system between a motor and a driving wheel, and be calculated as a difference between the motor speed and the wheel speed.

The speed difference determination unit 21 may use an equivalent wheel speed, i.e., a speed from the aspect of a motor, which is converted from the wheel speed detected by the wheel speed detection unit 12 (i.e., the measured wheel speed), as the wheel speed to calculate the rotational speed difference. For this purpose, the speed difference determination unit 21 may be configured to receive information regarding a current gear position of a transmission from a transmission control unit (TCU). Accordingly, the speed difference determination unit 21 may be configured to convert the measured wheel speed into the equivalent wheel speed that corresponds to the speed from the aspect of the motor using a gear ratio between the motor and the driving wheel acquired from the information regarding the current gear position received from the TCU (not shown).

The equivalent wheel speed is a speed from the aspect of the motor, which is converted from the measured wheel speed, and is thus a way of expressing a wheel speed equivalent to the motor speed. When the equivalent wheel speed is calculated, the speed difference determination unit 21 may be configured to calculate the rotational speed difference of the driving system, which is a difference between the actual motor speed detected by the motor speed detection unit 11 (i.e., the measured motor speed) and the equivalent wheel speed.

The following Equation 1 may be used to calculate the rotational speed difference.

$$\omega_d = \omega_m - \omega_w^* \quad \text{Equation 1}$$

wherein, $\omega_m$ indicates the motor speed which is detected by the motor speed detection unit 11, and $\omega_w^*$ indicates the equivalent wheel speed which is converted from the wheel speed, detected by the wheel speed detection unit 12, using the gear ratio.

Further, $\omega_d$ indicates the rotational speed difference of the driving system, which is the difference between the motor speed and the equivalent wheel speed. The rotational speed difference calculated by the speed difference determination unit 21 may be input to the torsion speed determination unit 22, and the torsion speed determination unit 22 may be configured to receive a motor torque command generated in real time during driving of the vehicle, together with the rotational speed difference.

The torsion speed determination unit 22 may then be configured to calculate a spring stiffness value of the driving system based on the rotational speed difference $\omega_d$ and information regarding the motor torque command (operation S4), and calculate a torsion speed value, which becomes a reference value, i.e., a reference torsion speed value, based on the calculated spring stiffness value of the driving system and the information regarding the motor torque command (operation S5).

The following Equation 2 may be used to estimate and calculate the spring stiffness value of the driving system using the rotational speed difference and the information regarding the motor torque command, and the following Equation 3 may be used to calculate the reference torsion speed value using the estimated spring stiffness value of the driving system and the information regarding the motor torque command. In other words, through arithmetic operations process using Equation 2 and Equation 3, the torsion speed determination unit 22 may be configured to acquire information regarding the spring stiffness of the driving system from the rotational speed difference of the driving system and the motor torque command, and then calculate the reference torsion speed value from the acquired information about the spring stiffness of the driving system and the motor torque command.

$$\dot{\hat{k}}_{spr} = \text{deadzone}(K_u \times (1 - \text{Flag}_{backlash}) \times (\omega_d - \hat{k}_{spr} \times \dot{T}_{cmd})) \quad \text{Equation 2}$$

$$\hat{\omega}_d = \hat{k}_{spr} \times \dot{T}_{cmd} \quad \text{Equation 3}$$

In Equation 2 and Equation 3, the hat(^) indicates an estimated value, and the dot(˙) indicates a differential value. In Equation 2, $K_u$ indicates an update gain which has a predetermined value, and the update gain $K_u$ having a value appropriate for distinguishing backlash from normal torsion due to application of a torque is predetermined.

Further, $\text{Flag}_{backlash}$ indicates a backlash flag, i.e., a backlash flag value, which is finally determined in an earlier determination cycle as feedback information, and may be determined as a value of 1 or 0 using the following Equation 7 which will be described below. In addition, $\hat{k}_{spr}$ indicates the spring stiffness value (e.g., an estimated spring stiffness value) desired to be acquired, i.e., the spring stiffness of the driving system to calculate the reference torsion speed, and $T_{cmd}$ indicates the motor torque command.

In Equation 2, deadzone(x) indicates a deadzone function which defines output thereof as 0 if x is within a predetermined deadband, and defines output thereof as x if x deviates from the deadband. Further, in Equation 3, $\hat{\omega}_d$ indicates the reference torsion speed (estimated value) desired to be acquired.

Referring to Equation 2 and Equation 3, the spring stiffness value of the driving system may be used to calculate the reference torsion speed, and although the spring stiffness value of the driving system is described as being repeatedly calculated using the same method for each backlash determination cycle to be updated with a new value, only a change in the spring stiffness rather than the spring stiffness value of the driving system may be updated. In particular, Equation 2 and Equation 3 may be replaced with the following Equation 4 and Equation 5.

$$\dot{\tilde{k}}_{spr} = \text{deadzone}(K_u \times (1 - \text{Flag}_{backlash}) \times (\omega_d - (\tilde{k}_{spr} + \bar{k}_{spr}) \times \dot{T}_{cmd})) \quad \text{Equation 4}$$

$$\hat{\omega}_d (\bar{k}_{spr} + \tilde{k}_{spr}) \times \dot{T}_{cmd} \quad \text{Equation 5}$$

In Equation 4 and Equation 5, $\bar{T}_{spr} + \tilde{k}_{spr}$ indicates the spring stiffness of the driving system, and among this expression indicating the spring stiffness of the driving system, $\bar{k}_{spr}$ is a constant, and $\tilde{k}_{spr}$ indicates a change in the spring stiffness which is actually periodically acquired calculated at each determination to be updated.

Thereafter, the backlash determination unit 23 may be configured to determine a backlash speed using the rotational speed difference value of the driving system received from the speed difference determination unit 21 and the reference torsion speed received from the torsion speed determination unit 22 (operation S6), and determine whether backlash occurs from the determined backlash speed (operation S7).

The following Equation 6 may be used to calculate the backlash speed using the rotational speed difference value $\omega_d$ calculated by the speed difference determination unit 21 and the reference torsion speed $\hat{\omega}_d$ calculated by the torsion speed determination unit 22. Further, the following Equation 7 defines a method for determining whether backlash occurs from the backlash speed.

$$\varepsilon = HPF(\omega_d - \hat{\omega}_d) \quad \text{Equation 6}$$

$$\text{Flag}_{backlash} = \begin{cases} 1, & \text{when } \varepsilon > \varepsilon_{threshold} \\ 0, & \text{when } \varepsilon \leq \varepsilon_{threshold} \end{cases} \quad \text{Equation 7}$$

In Equation 6, $\varepsilon$ indicates the backlash speed, and in the present disclosure, the backlash speed $\varepsilon$ is defined as a value acquired by subtracting the reference torsion speed $\hat{\omega}_d$ from the rotational speed difference value $\omega_d$, as expressed in Equation 6. Particularly, in the present disclosure, the backlash speed $\varepsilon$ may be defined as a filtered value of the value acquired by subtracting the reference torsion speed $\hat{\omega}_d$ from the rotational speed difference value $\omega_d$, and in this case, the filtered value may be acquired through high-pass filtering.

In Equation 6, HPF(x) is a filtering function to output a filtered value of x, and more particularly, a function to output a high-pass-filtered value of x. In Equation 6, the rotational speed difference value $\omega_d$ is the difference between the motor speed $\omega_m$ and the equivalent wheel speed $\omega_w^*$, which is calculated by the speed difference determination unit 21 using Equation 1, and the rotational speed difference value $\omega_d$ and the reference torsion speed $\hat{\omega}_d$, which is calculated by the torsion speed determination unit 22 using Equation 3, may be used to calculate the backlash speed $\varepsilon$ by the backlash determination unit 23.

In Equation 7, $\varepsilon_{threshold}$ indicates a backlash determination threshold which is predetermined by the backlash determination unit 23 to determine whether backlash occurs from the backlash speed $\varepsilon$ calculated using Equation 6. Further, in Equation 7, $Flag_{backlash}$ is the backlash flag indicating whether backlash occurs, i.e., a result of backlash determination.

As expressed in Equation 7, when the backlash speed $\varepsilon$ exceeds the backlash determination threshold $\varepsilon_{threshold}$, the backlash determination unit 23 may be configured to determine that backlash occurs, and generate and output a value of 1 that indicates that this section is a backlash section, as a value of the backlash flag $Flag_{backlash}$. On the other hand, when the backlash speed $\varepsilon$ is equal to or less than the backlash determination threshold $\varepsilon_{threshold}$, the backlash determination unit 23 may be configured to determine that no backlash occurs, and generate and output a value of 0 that indicates that this section is a non-backlash section, as the value of the backlash flag $Flag_{backlash}$. Accordingly, in the present disclosure, a section in which the backlash speed $\varepsilon$ defined in Equation 6 is greater than a constant value (e.g., the backlash determination threshold $\varepsilon_{threshold}$) may be determined as the backlash section in which backlash occurs.

As described above, in the present disclosure, backlash detection and determination may be executed using an arithmetic operation process using the above-described equations, i.e., Equations 1 to 7, in which data set by the speed difference determination unit 21, the torsion speed determination unit 22 and the backlash determination unit 23 may be input and stored.

Figure 3:
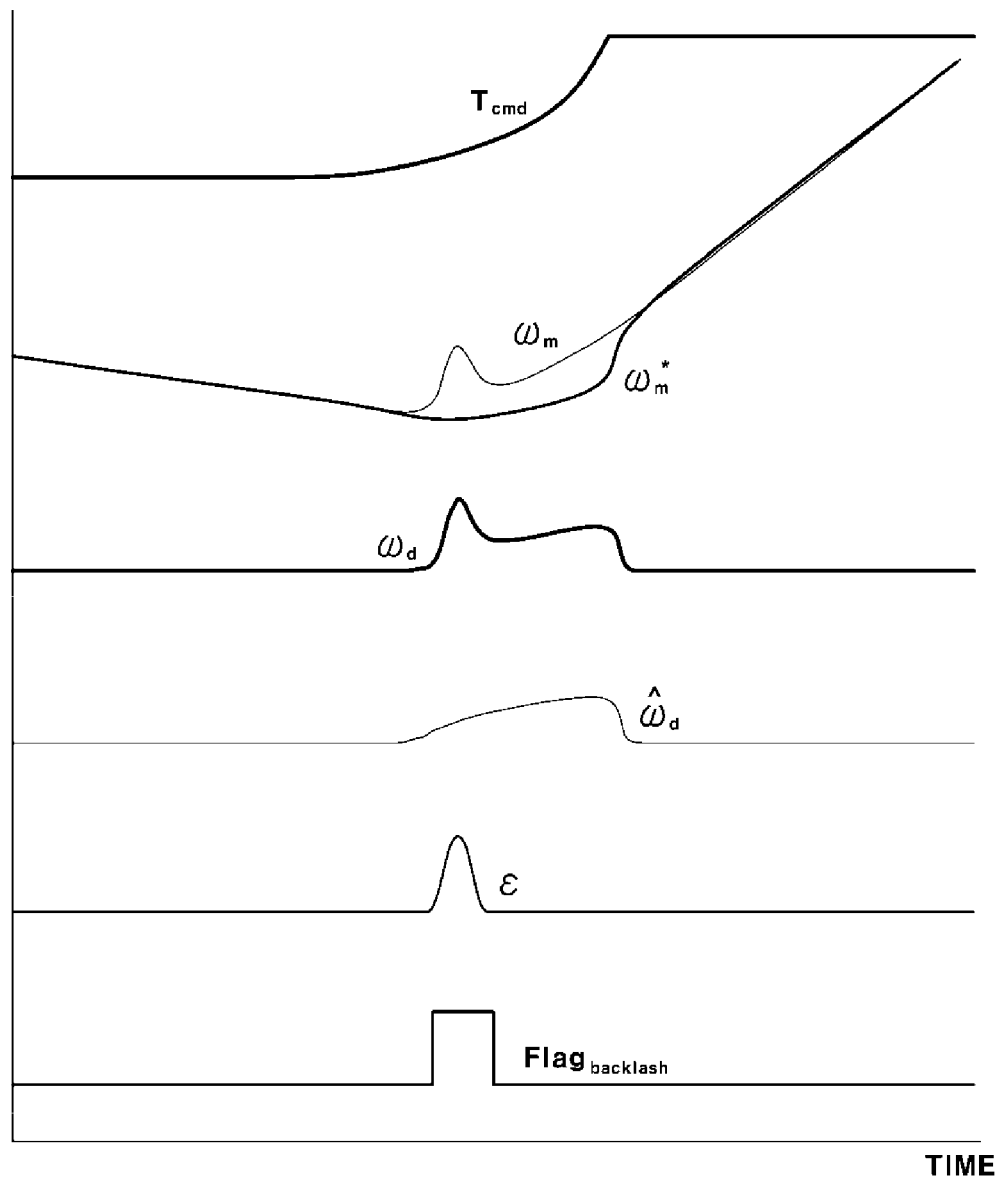
FIG. 3 is a graph exemplarily representing variables, calculated values and a backlash flag used in the method in accordance with one exemplary embodiment of the present disclosure.

FIG. 3 is a graph exemplarily representing variables, calculated values and a backlash flag used in the method in accordance with one exemplary embodiment of the present disclosure. FIG. 3 exemplarily illustrates the motor torque command $T_{cmd}$, the detected motor speed $\varepsilon_m$, and the equivalent wheel speed $\omega_w^*$ which is calculated from the detected wheel speed.

Further, FIG. 3 exemplarily illustrates the rotational speed difference $\omega_d$ of the driving system which is the difference between the motor speed $\omega_m$ and the equivalent wheel speed $\omega_w^*$, the reference torsion speed $\hat{\omega}_d$ which is calculated based on the rotational speed difference $\omega_d$ and the motor torque command $T_{cmd}$, and the backlash speed $\varepsilon$, which may be calculated as the difference between the rotational speed difference value $\omega_d$ and the reference torsion speed $\hat{\omega}_d$.

Moreover, FIG. 3 exemplarily illustrates the backlash flag $Flag_{backlash}$ as a result of backlash determination, and the backlash flag $Flag_{backlash}$ may be determined as having a value of 0 or 1 by comparing the backlash speed $\varepsilon$ to the backlash determination threshold $\varepsilon_{threshold}$. Although the exemplary embodiment of the present disclosure describes that the spring stiffness of the driving system is updated, instead of updating of the spring stiffness of the driving system, a change in the spring stiffness may be updated, as expressed in Equations 4 and 5.

Further, during a process of updating the spring stiffness, setting of a deadzone, setting of a constant and setting of a backlash flag condition may be performed in a changed order, and the backlash flag condition may be expressed as index values, in addition to Boolean values. Further, each signal used in the present disclosure may be used after pre-processing through use of an additional filter, and during a process for determining the backlash flag, other processes including the process using the equations may be added.

Accordingly, in accordance with the present disclosure, a section in which backlash in the driving system of the vehicle actually occurs may be more easily and accurately detected and determined. Further, reliability of a result of backlash determination in the vehicle may be improved, and thus accuracy and reliability of control of the vehicle requiring the backlash determination may be improved and contribute to control of the vehicle to reduce occurrence of backlash and resultant impact. Particularly, erroneous detection of reasonable torsion due to application of a torque as backlash may be prevented, and a process for empirically deriving a backlash section, which has been conventionally used to prevent such erroneous detection, may be omitted.

As is apparent from the above description, a system and method for determining backlash in a driving system of a vehicle in accordance with the present disclosure may more easily and accurately detect and determine a section in which backlash in the driving system of the vehicle actually occurs. Further, the system and the method may improve reliability of a result of backlash determination in the vehicle, and thus accuracy and reliability of control of the vehicle requiring the backlash determination may be improved and contribute to control of the vehicle to reduce occurrence of backlash and resultant impact. Particularly, the system and method may prevent erroneous detection of reasonable torsion due to application of a torque as backlash, and omit a process for empirically deriving a backlash section, which has been conventionally used to prevent such erroneous detection.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A system for determining backlash in a driving system of a vehicle, comprising:
    a motor speed sensor configured to detect a motor speed;
    a wheel speed sensor configured to detect a wheel speed;
    a speed difference determination unit, of a controller, configured to receive the detected motor speed and wheel speed and to determine a rotational speed difference of the driving system, occurring between a motor and a driving wheel, from the motor speed and the wheel speed;
    a torsion speed determination unit, of the controller, configured to receive the determined rotational speed difference of the driving system and to determine a reference torsion speed for backlash determination of the driving system based on the rotational speed difference of the driving system and a motor torque command generated during driving of the vehicle; and a backlash determination unit, of the controller, configured to receive the determined rotational speed difference of the driving system and the determined reference torsion speed, to determine a backlash speed that corresponds to a difference between the rotational speed difference of the driving system and the reference torsion speed, and to determine whether backlash in the driving system occurs using the determined backlash speed;

wherein the torsion speed determination unit is further configured to:

determine a spring stiffness of the driving system through an arithmetic operation process using equations using the determined rotational speed difference of the driving system and the motor torque command; and determine the reference torsion speed from the spring stiffness of the driving system and the motor torque command.

2. The system of claim 1, wherein the speed difference determination unit is configured to:

determine an equivalent wheel speed, which is a wheel speed equivalent to that of the motor, from the detected wheel speed using a gear ratio between the motor and the driving wheel; and determine a difference between the detected motor speed and the determined equivalent wheel speed as the rotational speed difference of the driving system.

3. The system of claim 1, wherein the torsion speed determination unit is configured to determine a value, acquired by multiplying the spring stiffness of the driving system by the motor torque command, as the reference torsion speed.

4. The system of claim 1, wherein the backlash determination unit is configured to determine a filtered value of a difference between the rotational speed difference of the driving system and the reference torsion speed, as the backlash speed.

5. The system of claim 4, wherein the filtered value is acquired through high-pass filtering.

6. The system of claim 1, wherein the backlash determination unit is configured to determine whether the backlash occurs by comparing the determined backlash speed to a predetermined backlash determination threshold.

7. The system of claim 6, wherein the backlash determination unit is configured to generate a backlash flag indicating whether the backlash occurs based on a result of the determination.

8. The system of claim 1, wherein the torsion speed determination unit is configured to determine a spring stiffness of the driving system through an arithmetic operation process using an Equation E1 using the rotational speed difference of the driving system and the motor torque command:

$$\dot{\hat{k}}_{spr} = \text{deadzone}(K_u \times (1 - \text{Flag}_{backlash}) \times (\omega_d - \hat{k}_{spr} \times \dot{T}_{cmd})), \quad \text{E1:}$$

wherein $K_u$ indicates a predetermined update gain, $\text{Flag}_{backlash}$ indicates a backlash flag value, which is a result of determination in an earlier determination cycle, $\omega_d$ indicates the rotational speed difference of the driving system, $\hat{k}_{spr}$ indicates the spring stiffness of the driving system, $T_{cmd}$ indicates the motor torque command, deadzone(x) indicates a deadzone function, and indicates a differential value.

9. The system of claim 1, wherein the torsion speed determination unit is configured to determine a spring stiffness of the driving system through an arithmetic operation process using an Equation E2 using the rotational speed difference of the driving system and the motor torque command:

$$\dot{\hat{k}}_{spr} = \text{deadzone}(K_u \times (1 - \text{Flag}_{backlash}) \times (\omega_d - (\bar{k}_{spr} + \hat{k}_{spr}) \times \dot{T}_{cmd})), \quad \text{E2:}$$

wherein $K_u$ indicates a predetermined update gain, $\text{Flag}_{backlash}$ indicates a backlash flag value, which is a result of determination in an earlier determination cycle, $\omega_d$ indicates the rotational speed difference of the driving system, $\bar{k}_{spr} + \hat{k}_{spr}$ indicates the spring stiffness of the driving system, $\bar{k}_{spr}$ is a predetermined constant, $\hat{k}_{spr}$ indicates a change in the spring stiffness which is acquired at each determination so as to be updated, $T_{cmd}$ indicates the motor torque command, deadzone(x) indicates a deadzone function, and indicates a differential value.

10. A method for determining backlash in a driving system of a vehicle, comprising:

detecting, by a motor speed sensor, a motor speed;

detecting, by a wheel speed sensor, a wheel speed;

determining, by a controller, a rotational speed difference of the driving system occurring between a motor and a driving wheel from the detected motor speed and the detected wheel speed;

determining, by the controller, a reference torsion speed for backlash determination of the driving system based on the determined rotational speed difference of the driving system and a motor torque command generated during driving of the vehicle;

determining, by the controller, a backlash speed that corresponds to a difference between the determined rotational speed difference of the driving system and the determined reference torsion speed;

determining, by the controller, whether backlash in the driving system occurs using the determined backlash speed;

determining, by the controller, a spring stiffness of the driving system through an arithmetic operation process using equations using the determined rotational speed difference of the driving system and the motor torque command; and determining, by the controller, the reference torsion speed from the spring stiffness of the driving system and the motor torque command.

11. The method of claim 10, wherein the controller is configured to:

determine an equivalent wheel speed, which is a wheel speed equivalent to the motor, from the detected wheel speed using a gear ratio between the motor and the driving wheel; and determine a difference between the detected motor speed and the determined equivalent wheel speed as the rotational speed difference of the driving system.

12. The method of claim 10, wherein the controller is configured to determine a value, acquired by multiplying the spring stiffness of the driving system by the motor torque command, as the reference torsion speed.

13. The method of claim 10, wherein the controller is configured to determine a filtered value of a difference between the rotational speed difference of the driving system and the reference torsion speed, as the backlash speed.

14. The method of claim 13, wherein the filtered value is acquired through high-pass filtering.

15. The method of claim 10, wherein the controller is configured to determine whether the backlash occurs by comparing the determined backlash speed to a predetermined backlash determination threshold.

16. The method of claim 15, wherein the controller is configured to generate a backlash flag indicating whether the backlash occurs based on a result of the determination.

17. The method of claim 16, wherein the controller is configured to determine a spring stiffness of the driving system through an arithmetic operation process using an Equation E1 using the rotational speed difference of the driving system and the motor torque command:

$$\dot{\hat{k}}_{spr} = \text{deadzone}(K_u \times (1-\text{Flag}_{backlash}) \times (\omega_d - \hat{k}_{spr} \times \dot{T}_{cmd})), \quad \text{E1:}$$

wherein $K_u$ indicates a predetermined update gain, $\text{Flag}_{backlash}$ indicates a backlash flag value, which is a result of determination in an earlier determination cycle, $\omega_d$ indicates the rotational speed difference of the driving system, $\hat{k}_{spr}$ indicates the spring stiffness of the driving system, $T_{cmd}$ indicates the motor torque command, deadzone(x) indicates a deadzone function, and indicates a differential value.

18. The method of claim 16, wherein the controller is configured to determine a spring stiffness of the driving system through an arithmetic operation process using an Equation E2 using the rotational speed difference of the driving system and the motor torque command:

$$\dot{\tilde{k}}_{spr} = \text{deadzone}(K_u \times (1-\text{Flag}_{backlash}) \times (\omega_d - (\bar{k}_{spr} + \tilde{k}_{spr}) \times \dot{T}_{cmd})), \quad \text{E2:}$$

wherein $K_u$ indicates a predetermined update gain, $\text{Flag}_{backlash}$ indicates a backlash flag value, which is a result of determination in an earlier determination cycle, $\omega_d$ indicates the rotational speed difference of the driving system, $\bar{k}_{spr} + \tilde{k}_{spr}$ indicates the spring stiffness of the driving system, $\bar{k}_{spr}$ is a predetermined constant, $\tilde{k}_{spr}$ indicates a change in the spring stiffness which is acquired at each determination so as to be updated, $T_{cmd}$ indicates the motor torque command, deadzone(x) indicates a deadzone function, and indicates a differential value.

* * * * *